United States Patent
Hayden

[11] Patent Number: 5,875,573
[45] Date of Patent: Mar. 2, 1999

[54] VERTICAL SPIN DITCHER WITH 3 POINT HITCH

[76] Inventor: John D. Hayden, 5161 Wayne Bridge Rd., Owensboro, Ky. 42301

[21] Appl. No.: 868,262

[22] Filed: Jun. 3, 1997

Related U.S. Application Data

[60] Provisional application No. 60/019,347 Jun. 7, 1996.
[51] Int. Cl.[6] ................................................... E02F 5/08
[52] U.S. Cl. ............................................. 37/91; 172/49.5
[58] Field of Search .................................. 37/91, 92, 93, 37/94, 189, 190, 906, DIG. 19; 172/78, 109, 63, 64, 108, 58, 47, 49.5, 110, 111

[56] References Cited

U.S. PATENT DOCUMENTS

| | | |
|---|---|---|
| 2,885,800 | 5/1959 | Hawkins . |
| 2,942,360 | 6/1960 | Hawkins et al. . |
| 3,021,621 | 2/1962 | Needham . |
| 3,168,785 | 2/1965 | Davis . |
| 3,624,826 | 11/1971 | Rogers . |
| 4,530,385 | 7/1985 | York ........................................ 37/92 X |
| 4,794,709 | 1/1989 | Rivard . |
| 4,887,372 | 12/1989 | Block ......................................... 37/91 |
| 5,113,610 | 5/1992 | Liebrecht, Jr. . |
| 5,237,761 | 8/1993 | Nadeau et al. ............................. 37/92 |
| 5,255,454 | 10/1993 | Pounds ...................................... 37/94 |

*Primary Examiner*—Thomas B. Will
*Assistant Examiner*—Robert Pezzuto
*Attorney, Agent, or Firm*—Richard C. Litman

[57] ABSTRACT

A ditch digger having a horizontal cutting disc with spaced and angled replaceable cutting blades housed within a circular frame and surrounded in one semicircle by a dirt blocking chain barrier and by a solid guard barrier in the other semicircle. The digger is attached to a farm tractor via a 3 point hitch and includes a power takeoff connection. The forward portion of the digger's superstructure has a pair of collapsible stands which support the digger with the rear end wheel during storage. The wheel is provided with a height adjustment device for the ditch digger and maintains the position of the ditch digger in the ditch being dug.

11 Claims, 3 Drawing Sheets

VERTICAL SPIN DITCHER WITH 3 POINT HITCH

CROSS-REFERENCE TO RELATED APPLICATION

This application claims the benefit of U.S. Provisional patent application Ser. No. 60/019,347, filed Jun. 7, 1996.

BACKGROUND OF THE INVENTION

1. Field of the Invention

The present invention relates to a ditching apparatus which forms long-lasting, no-till farming ditches which will not be as readily blocked by crossing with other farm equipment, and which minimize erosion in the bottom and walls of the concave-shaped ditches. The apparatus is attached to a farm tractor and can be readily stored with in situ support stands and a wheel being adjustable in height.

2. Description of the Prior Art

The prior art has mechanized ditch diggers for use on the farm and in construction work. However, no prior art has recognized the solution to the problem of regular farm ditches, which are normally shallow and narrow walled for irrigation purposes, from becoming clogged when other farm equipment such as a planter, a fertilizer applicator or a cultivator crosses the ditches. Other problems associated with maintenance of ditches are erosion in the bottom and the walls. Another problem is the arduous cleaning and the safe storage of the apparatus with its extended blades by providing extra support for elevating the apparatus.

The pertinent prior art will be discussed in the order of their perceived relevance to the present invention.

U.S. Pat. No. 2,885,800 issued on May 12, 1959, to John C. Hawkins describes a ditching machine attachment for a vehicle having a power take off mechanism. The rotary disc cutter consists of two conical plates joined with 8 curved knives interspersed with 8 elongated beater elements on one conical surface at its periphery. No dimensions of the disc cutter and its parts are disclosed. The orientation of the disc cutter is distinctly different from the present invention.

U.S. Pat. No. 2,942,360 issued on Jun. 28, 1960, to John C. Hawkins describes a ditching machine transversely mounted to one side of a tractor. The rotary disc cutter of the previous patent is inclined obliquely to cut a ditch with a concave configuration. There appears to be no provision for altering the disc cutter's angle of obliqueness to form a wider ditch. The ditch is approximately 50% wider than its depth. The power transmitting or driving system is based on a system of pulleys and the raising and lowering of the cutter by a pneumatic spring. A supporting bogy having two wheels in tandem is secured to the axle of the cutter and in front to support the superstructure. The vertical orientation of the rotary cutter is opposite in direction to that of the present invention.

U.S. Pat. No. 5,113,610 issued on May 19, 1992, to Sylvester Liebrecht, Jr. describes a rotating disk ditcher operated by and behind a remotely controlled tractor and a laser controlled method of forming longitudinal soil depressions utilizing the disk ditcher. The rotating cutter disk is 5 feet in diameter with five cutter blades which are 10 inches in diameter spaced around its periphery on the bottom surface. The circular cutter blades can be rotated periodically on the disk for longer use. On the top surface of the disk, 5–15 scoops having the dimensions, 12 inches wide, 9 inches high and 3 more inches bent at 45°, are located behind each cutter blade. The cutter disk rotates at 200 rpm. The angle of inclination from the ground is 20°. The lateral disk angle can be adjusted by a turnbuckle assembly. A support assembly is provided with a foot and positioned behind the rotating disk. The dirt is thrown outwardly 60–80 feet to the side. At a travel speed of 5 mph, a ditch 8–10 inches deep and 3–4 feet wide is formed. The patent recognizes that ditches with rounded out edges do not wear away as readily as conventional right angled walls and are better suited for planting of crops across the width of the ditch. However, since the apparatus is operated at an adjustable inclined angle, the soil is distributed in an uncontrolled direction to one side and over a great distance to prevent its repeated pickup.

U.S. Pat. No. 3,168,785 issued on Feb. 9, 1965, to George H. Davis describes a ditching machine positioned in front of and integrated with a tractor, and having a floating cutting head which has a flat surface fixed in a vertical position perpendicular to the ground. The cutting head is mounted forward of and at the bottom of a casing which contains the drive mechanism rotating the cutting head. A skid shoe is provided below the frame and is positioned at the same level as the scraper plate attached to the frame and protects the lower portion of the cutting head. Three detachable knives are spaced around the disc and project beyond the scraper plate. A V-shaped dirt shield is positioned above the cutting head to direct the extracted dirt to the sides. Although the circular cutting head is expected to cut a ditch with tapered sides, no dimensions of the cutting head or ditch are disclosed. The notable distinction is the orientation of the plane of the circular cutter.

U.S. Pat. No. 3,624,826 issued on Nov. 30, 1930, 1971, to Charlie M. Rodgers describes a rotary ditch cleaner having cutting blades and fins on a transverse rotor which is connected to the power take off shaft of a tractor. The rotor is journaled to a T-shaped frame bar which is connected to the tractor by three. link bar members. A height adjusting screw is provided in a cup member portion positioned at the top of the vertical post which supports the shaft-bearing sleeve and the frame bar. The rotor assembly is circular with four short cutting blades at the periphery and two long diametrically opposed fins or radial vane elements. These features face forward on the rotor assembly and are designed to clear irrigation ditches of grass, weeds, silt or other undesirable foreign material. A horizontal deflecting flange is located above the rotor assembly and is extended in the direction of the rotation of the rotor. A pair of skids is provided in front of the rotor assembly to support the rotor assembly and to facilitate the forward movement as the cleaning apparatus is pulled through the ditch. Again, the orientation of the cutting rotor is opposite to the present invention. Another distinction is the purpose of the apparatus being to clean ditches, and not to form lasting ditches.

U.S. Pat. No. 3,021,621 issued on Feb. 20, 1962, to Gideon M. Needham describes a drain digger designed to construct drains which connect ditches. A Y-frame is bolted onto the axle region of a tractor and is supported by a pair of lift arms connected to a cross-bar located higher on the tractor. The other end of the Y-frame is provided with a J-shaped guide shoe for vertical adjustment of the drain digger. Adjacent to the guide shoe, a bracket from the Y-frame supports the rotating shaft which carries the digging element. The digging element can be a singular circular plate with four scoops or a series of three sets of blades 2½ in. wide and 6½ in. long. In the series embodiment, the first set closest to the end with a square backup plate has four blades and the remaining two sets have only 2 blades each with the second set bisecting an angle between two blades of the first set and the third set positioned at a right angle to the second set. Since the drive shaft is inclined toward the ground, the three sets of blades in the second embodiment appear to have an advantage in efficiency over the first embodiment. However, the orientation of the blades are still substantially vertical to the ground.

U.S. Pat. No. 4,794,709 issued on Jan. 3, 1989, to Daniel Rivard describes a trench digging device for laying cables in level trenches. The cutting wheel is disposed vertically as a fifth wheel of the vehicle pulling the device. The cutting wheel and its lifting support structure are powered by a separate motor. The cutting wheel is as wide as a tire with angularly spaced cutting tools on its periphery. Throughbores proximate to the periphery of the cutting wheel are designed to prevent fouling. No dimensions of the cutting tools and their number on the wheel are disclosed. The emphasis is on the mobility of the device with its multiple hydraulic cylinders which operate to enable the device to pivot ill various directions. The orientation of the cutting wheel is a clear distinction.

None of the above inventions and patents, taken either singly or in combination, is seen to describe the instant invention as claimed.

SUMMARY OF THE INVENTION

The present invention provides a multi-bladed horizontal spin ditcher apparatus driven by a farm tractor to dig durable shallow ditches. The apparatus comprises a frame supported by a wheel in the rear and a 3 point hitch attachment to the tractor. A central housing contains the conventional beveled reduction gearing which transfers the rotary power from the tractor's transmission to a power takeoff element of the ditcher. The faster rotating speed from the tractor's transmission at an exemplary speed of 1000 RPM is reduced approximately to 500 RPM in the central housing. A rotary cutter disc assembly is housed within a semicircular housing suspended by chains from the central gear housing. A two-part dirt confinement means is provided around the perimeter of the rotary cutter disc assembly. There are 5 to 8 replaceable cutter blades. The rotary cutter disc assembly with the cutter blades can be adjusted in height or in the depth of the cut. The wheel acts as a stabilizer to maintain the apparatus in the ditch being made. The frame is structured with a pair of stands in front and a wheel in the rear which are adjustable in height to permit the cleaning and storage of the ditch digger apparatus without damage to the extended cutter blades.

Accordingly, it is a principal object of the invention to provide a multi-bladed horizontal spin ditcher with a 3 point hitch to a farm tractor for digging durable shallow ditches.

It is another object of the invention to provide a durable rotary cutter disc with replaceable cutter blades.

It is a further object of the invention to provide an effective dirt confinement means for the rotary cutter disc.

Still another object of the invention is to provide an adjustable height and stabilizer means for the horizontal spin ditcher.

Yet another object of the invention is to provide an effective elevating means for the cleaning and storage of the apparatus by maintaining the cutter blades off the floor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention provides a durable farm implement for forming irrigation ditches which will last for years without the recurring problems of damaging crossovers by other farm equipment while cultivating, fertilizing or planting the fields. The size and shape of the ditches formed by this invention have withstood such deteriorating problems over an extended period.

Figure 1:
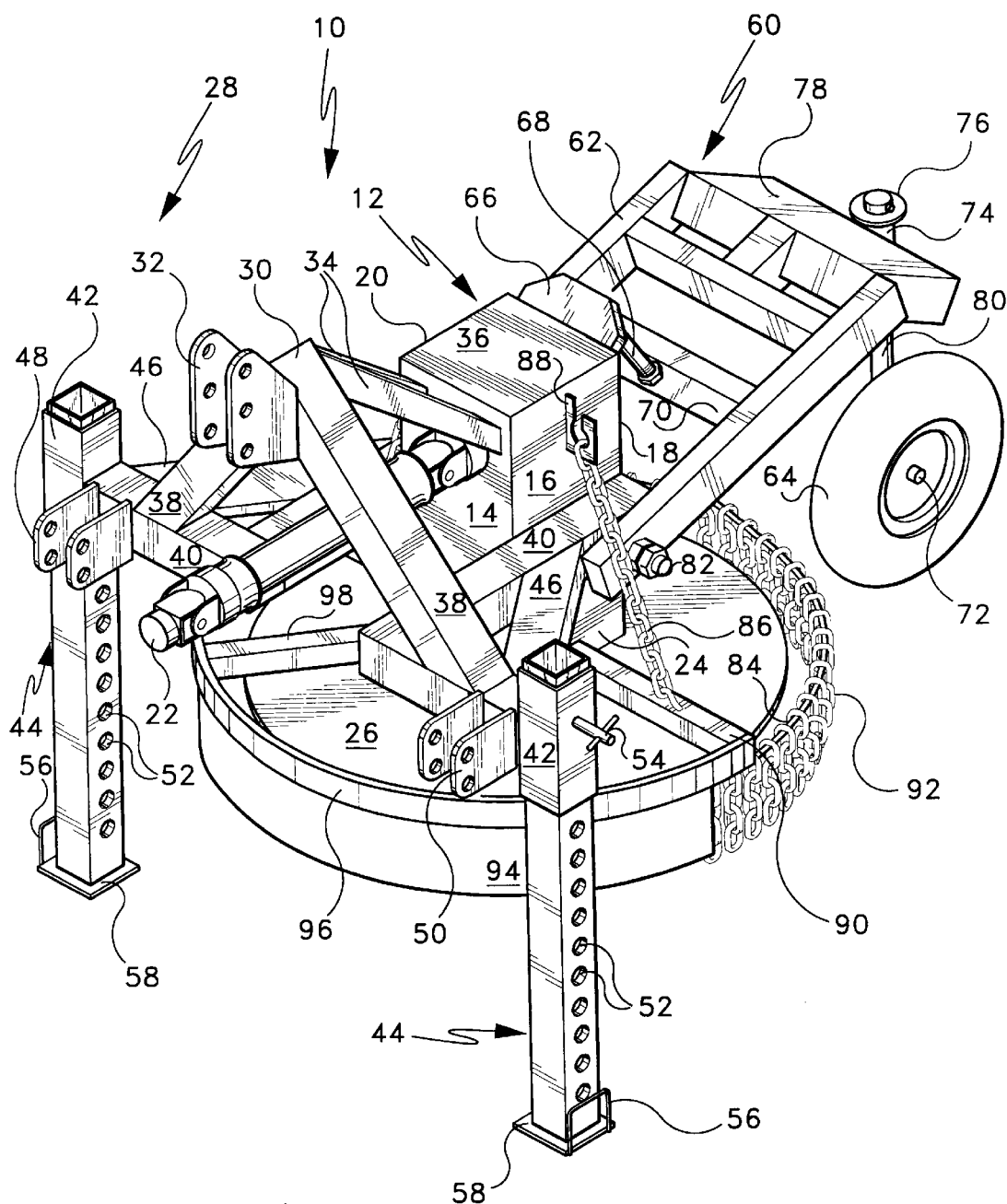
FIG. 1 is a perspective view of the horizontal spin ditcher in the stored position.
Figure 2:
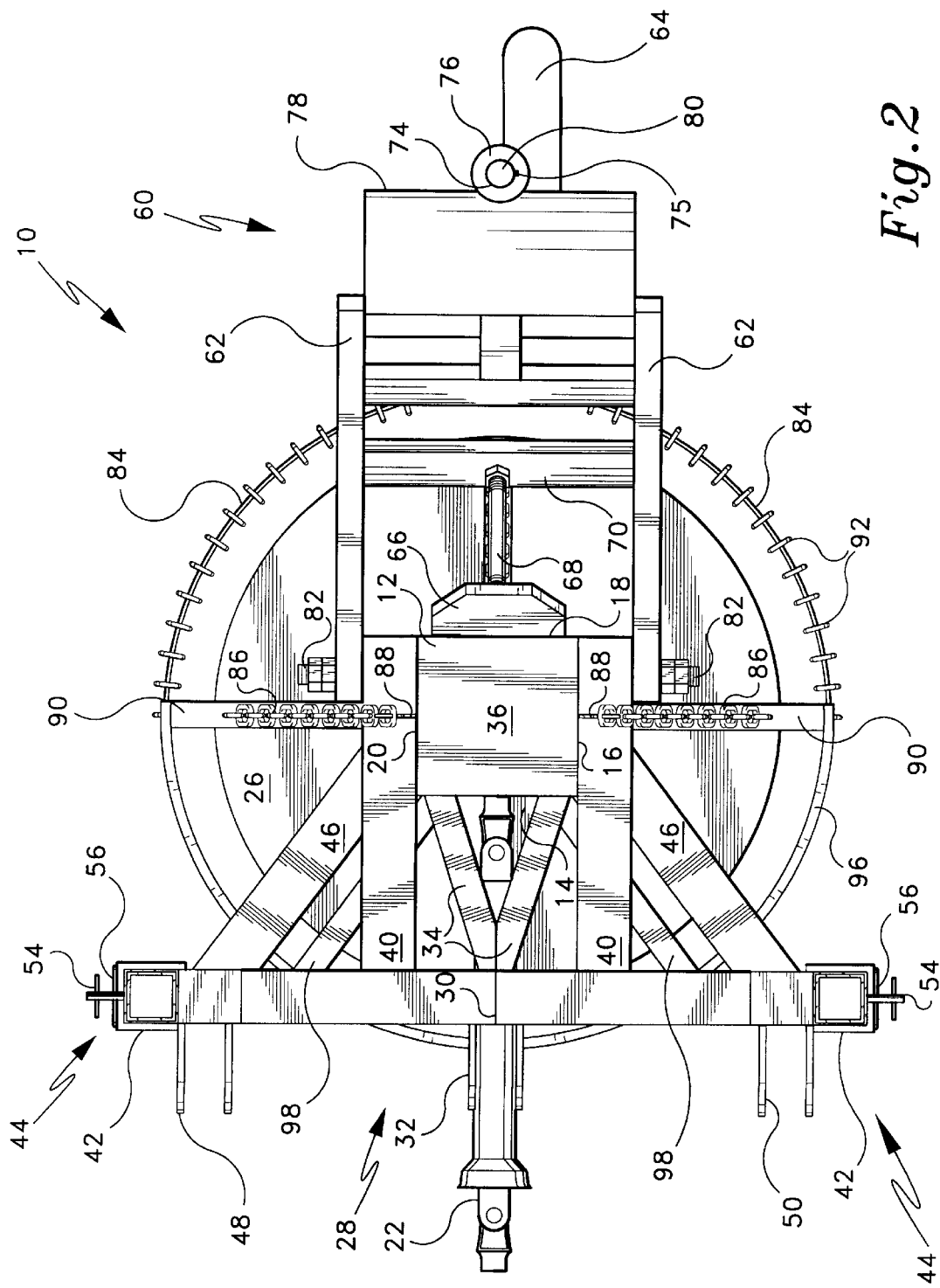
FIG. 2 is a top view of the horizontal spin ditcher.

FIGS. 1 and 2 illustrate the horizontal spin ditcher 10 in a stored position. The ditch digger is designed for durability in farming. The square gear housing 12 has four rectangular sides: forward side 14, right side 16, rear side 18, and left side 20. Housing 12 contains conventional bevelled gearing (not shown) which transmits the power from a tractor's transmission to the power takeoff element 22 from the forward side 14 to the bottom 24 of the housing 12 to the rotary cutter disc 26 (FIG. 2). The forward side 14 also supports a superstructure 28 in the form of an inverted V. The superstructure 28 has an apex 30 whose forward face supports an apertured lug 32 as one hitch point of the 3 point hitch. On the rear face of the superstructure at the apex 30, two support bars 34 are joined and bifurcate to join the forward side of housing 12 near the top side 36. Each foot 38 of the superstructure 28 joins a horizontal elbow 40 which supports a vertical square casing 42 for the square standpipes 44. The other end of each elbow 40 joins the right side 16 and left side 20, respectively, of the gear housing 12. A bar 46 braces the inside of each elbow 40. At the juncture of each foot 38 and casing 42, the second apertured lug 48 and the third apertured lug 50 are located and complete the 3 point hitch attachment to a tractor. The vertical stands have pinholes 52 through which the pin 54 is inserted from casing 42 for height adjustment during storage and clearance during use. A hand ring 56 is conveniently placed at the outside of the base 58 of each standpipe 44 for adjusting the height.

The rear side 18 of the gear housing 12 has a projecting stabilizer or support element 60, made up of a frame 62 for supporting a wheel 64 on an axle 65. A flange 66 which is located proximate to the top side 36 of housing 12 is inclined upward and holds a rod 68 which extends downward to a crossbar 70 of the frame 62. Rod 68 engages the flange 70 with a threaded end with height adjustment bolts placed on either side of the crossbar 70. From the free end 78 of the stabilizer frame 62, vertical cylindrical support 74 supports a vertical curvilinear post 80. Rotatable post 80 supports the wheel 64 on its axle 72. The post 80 is secured by a cotter pin 75 above the fixed cylindrical support 74 and below by a fixed flange 76 for removal of the post 80 and the wheel 64 if deemed necessary. The stabilizer or support element 60 is hinged to the right side 16 and the left side 20 of the gear housing 12 through the longer legs of the horizontal elbow elements 40 by bolts 82. By this adjustment and hinged means, the height of the horizontal spin ditcher 10 above the newly formed ditch can be adjusted. An additional benefit is the use of the stabilizer element 60 and the wheel 64 to maintain the spin ditcher 10 in the ditch during the digging process. A further benefit is for cleaning and storage when the rotary cutter disc 26 must be kept off the floor to minimize stress on the apparatus.

The rotary cutter disc assembly 26 (see FIG. 3) is housed within a semicircular or half-ring housing 84 which is suspended from the right side 16, rear side 18, and left side 20 by chains 86 hooked onto open lugs 88 located proximate to the top side 36 of the housing 12. Three horizontal bars 90 are affixed at the bottom of the housing 12 on the same three sides with hinges (not shown in FIGS. 1 and 2). By means of the chains 86 and the hinged half-ring housing 84 with its semicircular arrangement of dangling chain links 92, a height adjustment can be made in the field regarding the expulsion of dirt from the revolving cutter disc assembly 26.

Another dirt guard in the form of a semicircular solid plate 94 is braced by a semicircular band 96 and two horizontal support arms 98 which are fixed to the bottom of the housing 12 on the forward side 14. This dirt guard cannot be adjusted in height, but protects the tractor and the tractor operator from any dirt issuing from the spin ditcher 10.

Figure 3:
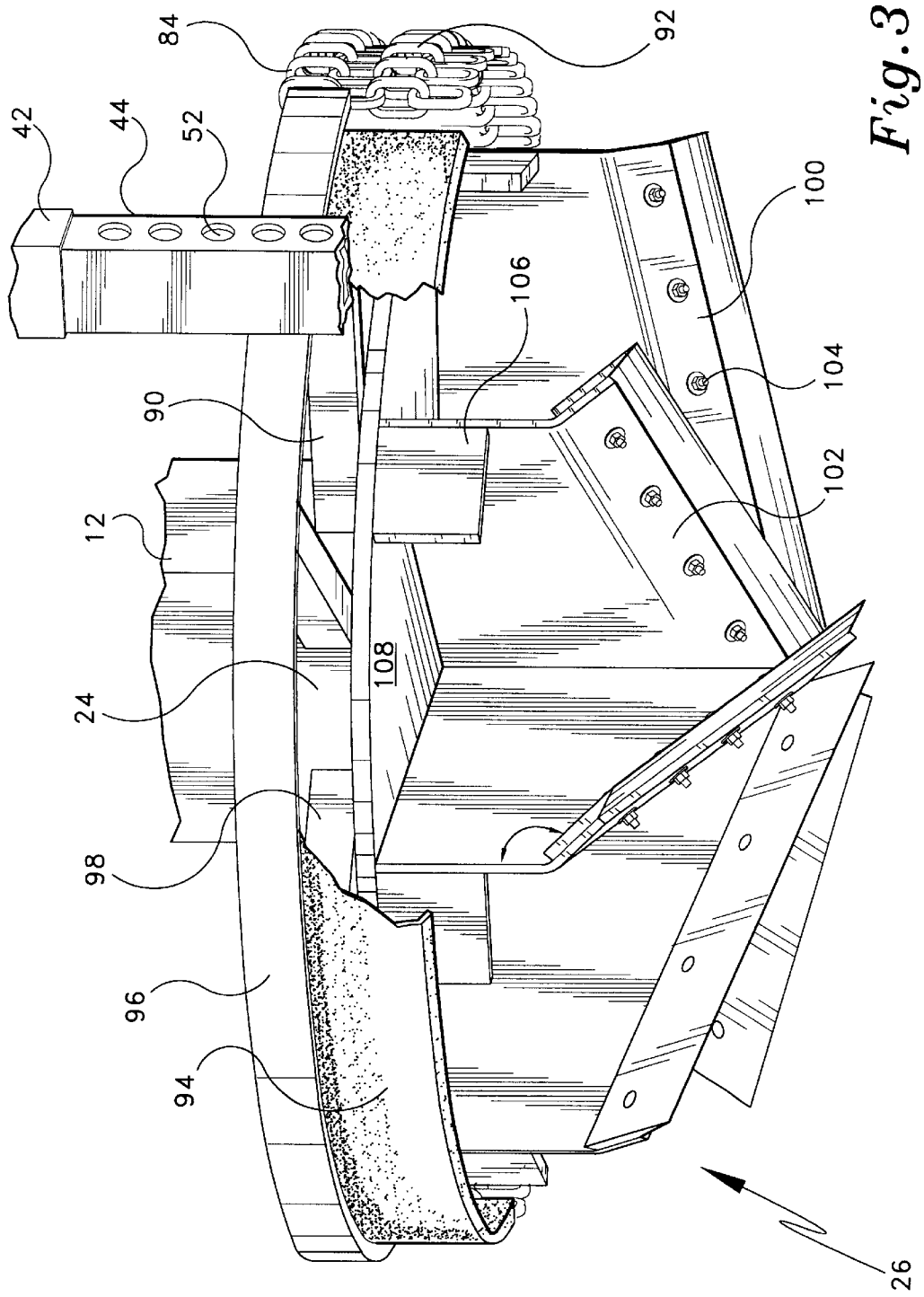
FIG. 3 is a partial side view of the cutter portion with a breakaway of the guard frame.

Turning to FIG. 3, an enlarged view of the rotary cutter disc assembly 26 is illustrated with only 5 of the 7 cutter blades 100 visible. It is contemplated to employ 5–8 blades. The cutter blades 100 are removably attached to cutter blade supports 102 by fasteners 104. Cutter blade supports 102 are reinforced by gussets 106 which join the cutter blade supports at the intersection of their bases with the base plate 108 of the rotary cutter disc assembly 26 on the downstream side. The cutter blade supports 102 are vertical for ⅔ of their length and then angled in the cutting direction at approximately 150°. The cutter blade supports 102 are deeper at the center than at the outside edge. It is contemplated to use the horizontal spin ditcher to not only dig new ground but also maintain old ditches free of rubble and weeds.

Exemplary dimensions of the horizontal spin ditcher which are mainly metal parts unless otherwise noted are as follows:

Gear housing 12: 27 in. high and 12 in. square.

Rotary cutter disc 26: Diameter, 42 in.; vertical cutter blade supports 102, 24 in. long, vertical 6 in., bent 3 in. at the bottom and 17 in. deep at the center of the disc; cutter blades 100, 4 in. wide, 24 in. long; gussets 106, 3 in. by 2 in.

Forward dirt guard 94: semicircular 6 in. wide strip of black rubber sheeting (preferred) or stainless steel suspended from a 2 in. steel band supported by two horizontal 2 in. square metal tubing for arms 98 which are connected to the gear housing 12.

Rear dirt guard housing 84: half-ring supporting evenly distributed four-link chains 92, supported by three hinged horizontal 2 in. square tubing for support bars 90, and adjustable in height due to chains 86 on open lugs 88 on sides 16, 18 and 20.

Superstructure 28 on the forward side 14 of gear housing 12: V-shaped portion, 4 in. square tubing supported by two 2 in. square tubing from the apex to the forward side 14 of gear housing 12; first centered lug 32 positioned 18 in. center to center vertically from the bottom two lugs 48 and 50 which are 32 in. apart to form the 3 point hitch; and two 4 in. square casings 42 for 3½ in. square hollow standpipes 44 with pinholes 52.

Stabilizer element 60: stabilizer frame 62, 4 in. by 2 in. tubing, 36 in. long and 24 in. wide; rod 68, 24 in. long, 1¼ in. diameter; wheel 64, 20 in. overall diameter on 12 in. rim; and the curvilinear post 80 to the axle 72, 26 in. long.

Therefore, a five-inch deep ditch will be approximately 30 inches wide at the surface with sloping sides. An eight-inch deep ditch will be approximately 40 inches wide at the surface with sloping sides. These ditches will be dug in low terrain where drainage is desired in the flooding field.

It is to be understood that the present invention is not limited to the sole embodiment described above, but encompasses any and all embodiments within the scope of the following claims.

I claim:

1. A horizontal spin ditcher apparatus connectable to a tractor and being self-standing for safe storage comprising:

a three point hitch means for a power takeoff means from the tractor;

a gearbox housing attachable to the power takeoff means and having at least a forward side, a rear side, a right side, a left side, and a bottom side;

a vertical drive means within said gearbox housing;

a rotary cutter disc attached to said vertical drive means;

removable cutting blade means attached to said rotary cutter disc;

a support frame having a free end and hinged rearwardly of the gearbox housing to the right and left sides of said gearbox housing for adjustment in height of the free end the support frame being adjustable in height by adjusting the length of a rod attached to the support frame and to an inclined flange on the rear side of the gearbox housing;

a wheel attached to the free end of the support frame by a vertical post; and a pair of stands with adjustable height means being positioned proximately on the right and left sides and to the front side of the gearbox housing; whereby the horizontal spin ditcher can be powered by the tractor to dig long lasting shallow ditches at various depths, and said ditcher can be cleaned and stored by utilizing said adjustable stands and wheel.

2. The ditcher apparatus according to claim 1, wherein the three-point hitch means further comprises an inverted V-shaped superstructure having ends being connected to the forward side of the gearbox housing on the right side and the left side, and includes a first lug for a first hitch being positioned on the apex of the inverted V-superstructure, and a second lug and a third lug being positioned proximate to each end of the inverted V-superstructure for attachment to the tractor.

3. The ditcher apparatus according to claim 2, including each stand being collapsible and attached to an end of the inverted V-shaped superstructure.

4. The ditcher apparatus according to claim 1, including a two-section circular housing means for constraining dirt from freely discharging from said circular housing.

5. The ditcher apparatus according to claim 4, wherein said two-section circular housing means having a forward semicircular section attached to the forward side of the gear housing by fixed radial supports.

6. The ditcher apparatus according to claim 5, wherein said forward semicircular section being bordered with a vertical guard plate.

7. The ditcher apparatus according to claim 4, wherein said two-section circular housing means having a rear semicircular section attached to the rear side of the gear housing by hinged radial supports.

8. The ditcher apparatus according to claim 7, wherein the rear semicircular section being bordered with segments of linked chain and adjustable in height by chains attached at regular intervals at the right side, the left side and the rear side of the gearbox housing by lugs.

9. The ditcher apparatus according to claim 1, wherein said rotary cutter disc having multiple vertical cutter blade supports extending below and radially, which supports are shorter at the periphery and have angled bends at the bottom ends.

10. The ditcher apparatus according to claim 9, wherein said multiple cutter blade supports and replaceable cutting blades number in the range of five to seven.

11. The ditcher apparatus according to claim 1, wherein said gear housing containing beveled gearing for rotating power at a predetermined RPM from a power takeoff source and transmitting said rotating power at approximately one-half the predetermined RPM to said rotary disc.

* * * * *